(12) United States Patent
Jeon

(10) Patent No.: US 8,157,334 B2
(45) Date of Patent: Apr. 17, 2012

(54) BRAKE SYSTEM FOR VEHICLE HAVING REGENERATIVE BRAKING FUNCTION

(75) Inventor: Gabbae Jeon, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 955 days.

(21) Appl. No.: 12/128,418

(22) Filed: May 28, 2008

(65) Prior Publication Data

US 2009/0151345 A1 Jun. 18, 2009

(30) Foreign Application Priority Data

Dec. 15, 2007 (KR) ........................ 10-2007-0131796

(51) Int. Cl.
*B60T 8/64* (2006.01)

(52) U.S. Cl. .................. 303/152; 303/117.1; 303/119.1; 303/16.1

(58) Field of Classification Search .................. 303/151, 303/152, 113.5, 115.2, 116.1, 116.2, 117.1, 303/119.1, 119.2

See application file for complete search history.

(56) References Cited

U.S. PATENT DOCUMENTS

| | | | |
|---|---|---|---|
| 5,333,944 A * | 8/1994 | Shirai et al. | 303/177 |
| 5,716,108 A | 2/1998 | Asa et al. | |
| 5,882,093 A | 3/1999 | Enomoto et al. | |
| 6,086,165 A * | 7/2000 | Fujioka et al. | 303/119.2 |
| 6,203,123 B1 * | 3/2001 | Oyama | 303/191 |
| 6,247,765 B1 * | 6/2001 | Oyama | 303/119.2 |
| 6,641,233 B2 * | 11/2003 | Kusano et al. | 303/152 |
| 6,979,062 B2 * | 12/2005 | Yoshino et al. | 303/116.2 |

FOREIGN PATENT DOCUMENTS

| | | |
|---|---|---|
| JP | 62-247959 | 10/1987 |
| JP | 1-095960 | 4/1989 |
| JP | 8-149607 | 6/1996 |
| JP | 10-14008 A | 1/1998 |
| JP | 2001-213302 | 8/2001 |
| JP | 2006-264359 A | 10/2006 |
| KR | 1020000019335 | 4/2000 |
| KR | 1020070059556 | 6/2007 |

* cited by examiner

*Primary Examiner* — Robert A Siconolfi
*Assistant Examiner* — Mariano Sy
(74) *Attorney, Agent, or Firm* — Morgan, Lewis & Bockius LLP

(57) ABSTRACT

A brake system of a vehicle with a regenerative braking function, such as a hybrid electric vehicle. A regenerative braking hydraulic pressure line connects a master cylinder with a wheel cylinder. A regenerative control valve opens and closes the regenerative braking hydraulic pressure line. A proportional control valve is disposed in the regenerative braking hydraulic pressure line. The proportional control valve includes a spool, and output characteristics of the proportional control valve vary in response to an amount of pressure applied to the spool. A spool operator changes the amount of pressure applied to the spool.

2 Claims, 3 Drawing Sheets

PRESSURE INCREASED/REDUCED

BRAKE SYSTEM FOR VEHICLE HAVING REGENERATIVE BRAKING FUNCTION

CROSS-REFERENCE TO RELATED APPLICATIONS

The present application is based on, and claims priority from, Korean Application Serial Number 10-2007-0131796, filed on Dec. 15, 2007, the disclosure of which is hereby incorporated by reference herein in its entirety.

FIELD OF THE INVENTION

The present invention relates to a brake system of a vehicle with a regenerative braking function, such as a hybrid electric vehicle.

BACKGROUND OF THE INVENTION

Under normal, non-regenerative braking in a vehicle with a regenerative braking function, as the brake pedal is pushed by a driver, hydraulic pressure, generated by a master cylinder, is supplied to a wheel cylinder through a supply control valve, thus braking the wheel.

Under regenerative braking, the supply control valve is closed, and some of the brake fluid returns to an oil reservoir of the master cylinder through a return control valve, reducing the pressure in the wheel cylinder. When the pressure in the wheel cylinder reaches a desired value, the return control valve is closed.

One of two methods is typically used to additionally increase the pressure in the wheel cylinder during regenerative braking. The first is to reopen the supply control valve, which rapidly increases the stroke of the brake pedal and causes the pedal to sink. The second is to activate a hydraulic pressure pump using a motor, which causes operational noise of the motor and pump. The limited durability of the motor and pump are also concerns.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Disclosed is a brake system of a vehicle with a regenerative braking function, such as a hybrid electric vehicle. A regenerative braking hydraulic pressure line connects a master cylinder with a wheel cylinder. A regenerative control valve opens and closes the regenerative braking hydraulic pressure line. A proportional control valve is disposed in the regenerative braking hydraulic pressure line. The proportional control valve includes a spool, and output characteristics of the proportional control valve vary in response to an amount of pressure applied to the spool. A spool operator changes the amount of pressure applied to the spool.

The spool operator may include a solenoid.

The regenerative control valve may be closer to the master cylinder, and farther from the wheel cylinder, than the proportional control valve.

BRIEF DESCRIPTION OF THE DRAWINGS

For better understanding of the nature and objects of the present invention, reference should be made to the following detailed description with the accompanying drawings, in which.

DETAILED DESCRIPTION OF THE PREFERRED EMBODIMENTS

Figure 1:
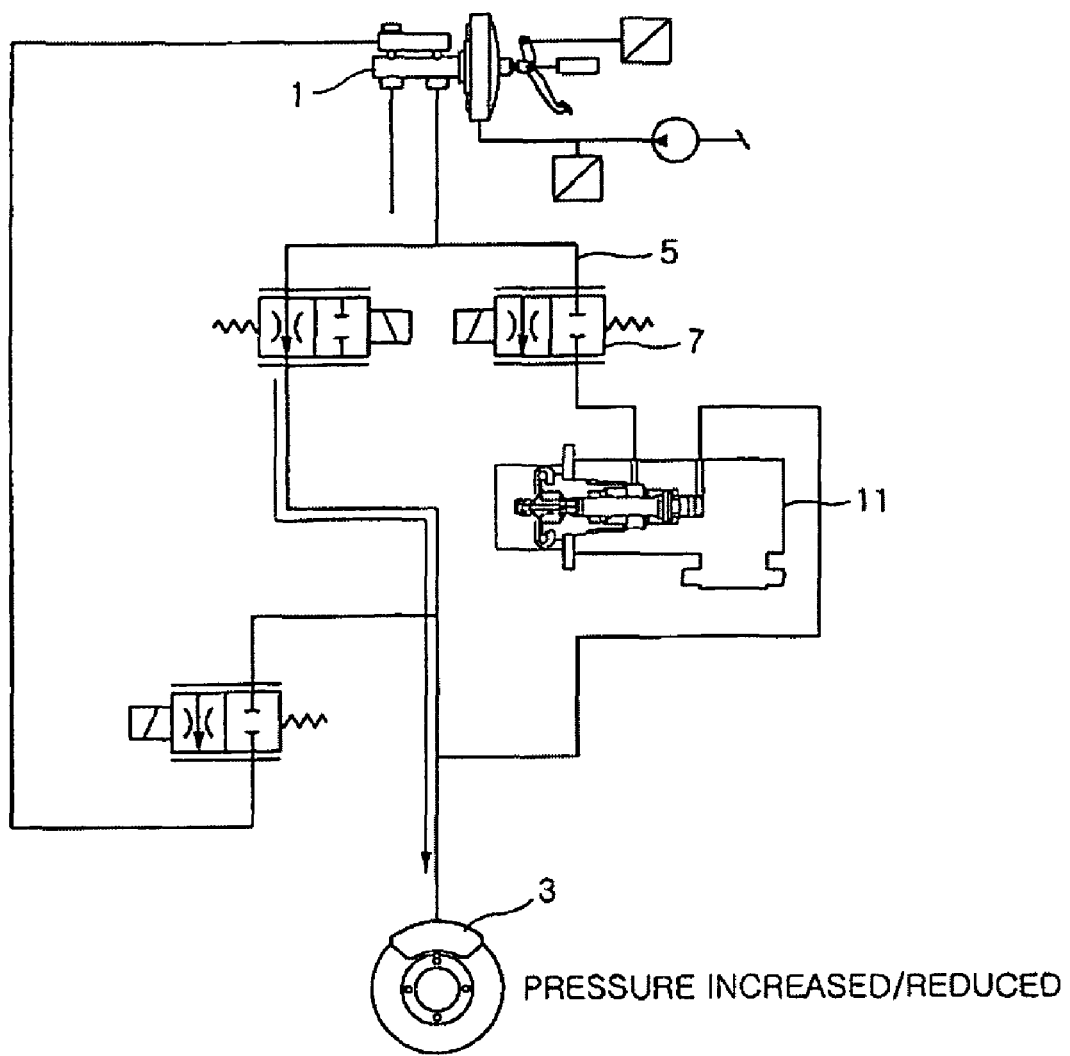
FIGS. 1 and 2 are partly schematic view of a brake system according to an embodiment of the invention.
Figure 2:
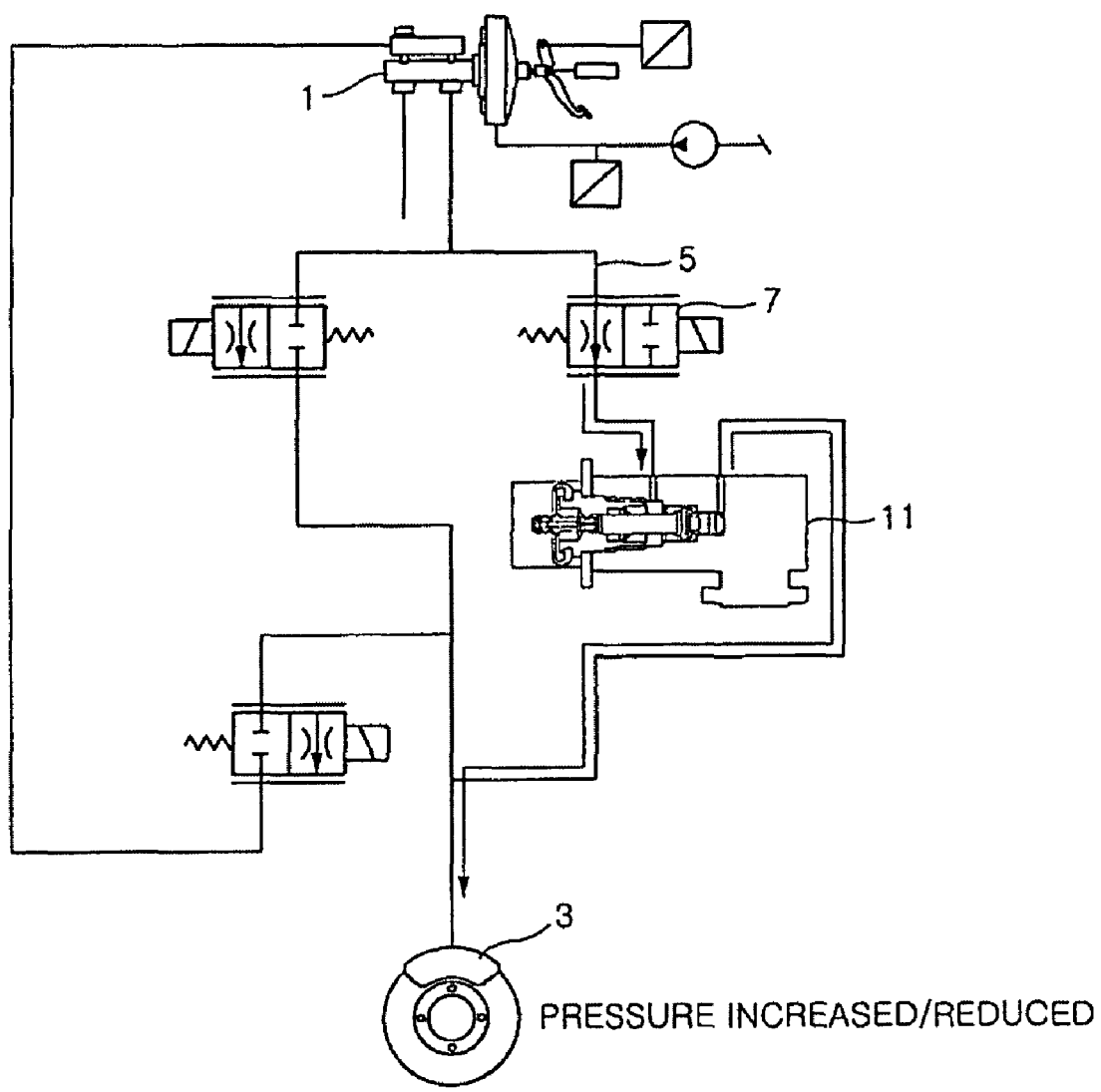
Figure 3:
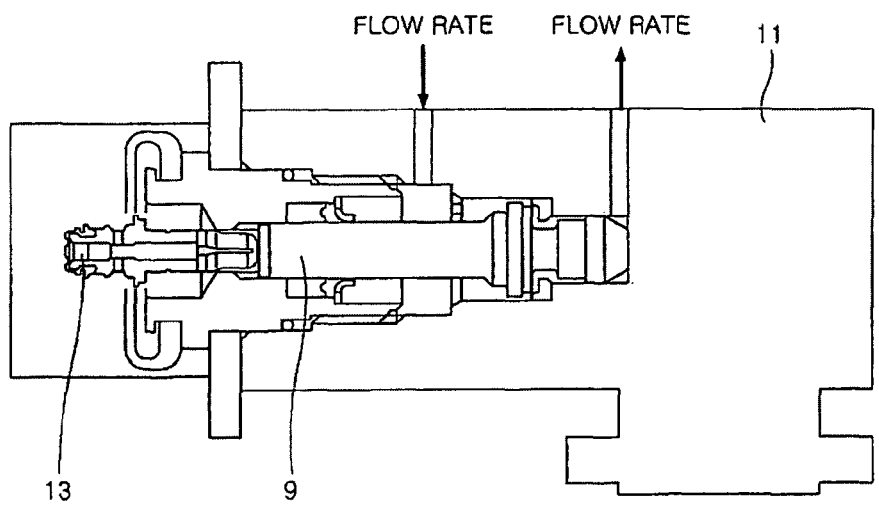
FIG. 3 is an enlarged view of a proportional control valve and a spool operator of FIGS. 1 and 2.

Referring to FIGS. 1 to 3, a brake system for a vehicle having a regenerative braking function according to an embodiment of the invention includes: a regenerative braking hydraulic pressure line 5 that connects a master cylinder 1 with a wheel cylinder 3; a regenerative control valve 7 that opens and closes regenerative braking hydraulic pressure line 5; and a proportional control valve 11 in regenerative braking hydraulic pressure line 5.

Figure 4:
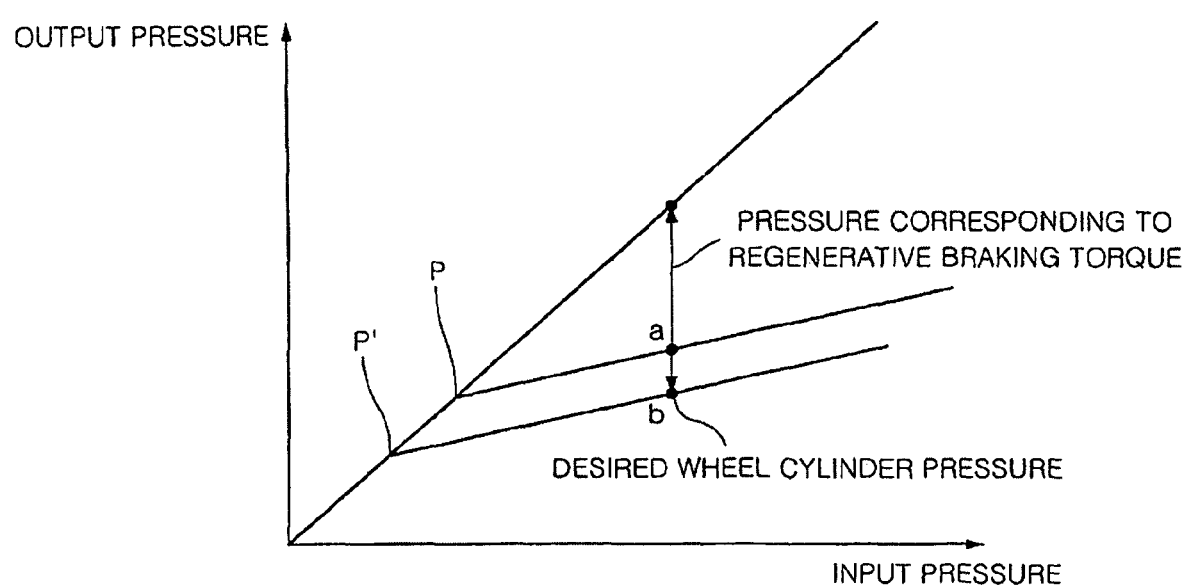
FIG. 4 is a graph illustrating characteristics of input-output pressure of the proportional control valve by the proportional control valve and the spool operator.

The proportional control valve 11 defines a pressure node p (see FIG. 4). Referring also to FIG. 3, the pressure node p moves with change in pressure applied to spool 9 of pressure control valve 11. A spool operator, such as a solenoid actuator 13, changes the pressure applied to the spool 9. Solenoid actuator 13 is provided where external load is applied by the weight of a vehicle. An input port of proportional control valve 11 is connected to master cylinder 1 through regenerative braking hydraulic pressure line 5, and an output port of proportional control valve 11 is connected to wheel cylinder 3 through regenerative braking hydraulic pressure line 5.

Regenerative control valve 7 is disposed closer to master cylinder 1, and farther from wheel cylinder 3, than proportional control valve 11.

Referring to FIG. 4, as pressure is supplied from master cylinder 1, the rate of change of output pressure with respect to the input pressure decreases after pressure node p. Further, when a predetermined, pressure of master cylinder is applied as the input pressure, the output pressure at the output port is a. When the desired pressure is b in regenerative braking, solenoid actuator 13 is controlled such that the pressure node moves from p to p', thereby outputting the desired pressure of b. Further, it is possible to control solenoid actuator 13 to increase the pressure in wheel cylinder 3 such that pressure node p moves up.

The operation of the above system is as follows.

FIG. 1 illustrates normal, non-regenerative braking. Regenerative control valve 7 closed, such that hydraulic pressure of master cylinder 1 is supplied to wheel cylinder 3 through the unnumbered supply control valve to the left of regenerative control valve 7 in the drawing.

FIG. 2 illustrates regenerative braking, in which the supply control valve is closed, while regenerative control valve 7 is open, such that the hydraulic pressure generated from master cylinder 1 is supplied to wheel cylinder 3 through regenerative control hydraulic pressure line 5.

For this operation, the pressure of wheel cylinder 3 should be reduced at a predetermined value corresponding to a braking force by regenerative braking torque and the amount of reduction is compensated across proportional control valve 11.

That is, pressure is applied to the input port of proportional control valve 11 by master cylinder 1. There is a pressure drop across proportional control valve 11, and the lower pressure at the output port is supplied to wheel cylinder 3. Therefore, any desired pressure is supplied from proportional control valve 11 to wheel cylinder 3 by controlling solenoid actuator 13 to shift pressure node p of proportional control valve 11 to any desired point.

Therefore, when the brake pedal is pushed by a driver to additionally increase the pressure in wheel cylinder 3, normal operation of the brake pedal is achieved, without sinking of the brake pedal or stroke increase.

Although the preferred embodiment of the present invention has been disclosed for illustrative purposes, those skilled in the art will appreciate that various modifications, additions and substitutions are possible, without departing from the scope and spirit of the invention as defined in the accompanying claims.

What is claimed is:

1. A brake system, comprising:
   a regenerative braking hydraulic pressure line that connects a master cylinder with a wheel cylinder;
   a regenerative control valve disposed in the regenerative braking hydraulic pressure line for opening the regenerative braking hydraulic pressure line when supplied with power and for closing the regenerative braking hydraulic pressure line when not supplied with power;
   a proportional control valve disposed in the regenerative braking hydraulic pressure line to supply the hydraulic pressure supplied from the master cylinder through the regenerative control valve to the wheel cylinder during regenerative braking, wherein the proportional control valve comprises a spool, and wherein output characteristics of the proportional control valve vary in response to an amount of pressure applied to the spool; and
   a spool operator that changes the amount of pressure applied to the spool;
   wherein the regenerative control valve is disposed closer to the master cylinder, and farther from the wheel cylinder, than the proportional control valve.

2. The brake system as defined in claim 1, wherein the spool operator comprises a solenoid.

* * * * *